United States Patent [19]
Doering

[11] 3,847,730
[45] Nov. 12, 1974

[54] PEAK RESPONSIVE CONTROL SYSTEM AND METHOD

[75] Inventor: George I. Doering, Columbus, Ohio

[73] Assignee: Industrial Nucleonics Corporation, Columbus, Ohio

[22] Filed: Mar. 30, 1973

[21] Appl. No.: 346,295

Related U.S. Application Data

[63] Continuation of Ser. No. 726,439, May 3, 1968, abandoned.

[52] U.S. Cl. .................. 162/198, 73/73, 162/253, 162/258, 162/263, 162/DIG. 6, 235/151.3
[51] Int. Cl. .............................................. D21f 7/00
[58] Field of Search ........... 162/198, 253, 252, 258, 162/262, 263, DIG. 6; 73/73; 235/151.35, 150.1, 151.13, 151.3

[56] References Cited
OTHER PUBLICATIONS

Church, F., "Moisture and Substance Control on the Paper Machine," Pulp & Paper Mag. of Canada, (1-1965), p. T3-T10.

Dipre, J. G., "New England Closed Loop Control of Basis Wt.," Tappi, V. 46, No. 11, (11-1963), p. 178A-181A.

Primary Examiner—S. Leon Bashore
Assistant Examiner—A. D'Andrea, Jr.
Attorney, Agent, or Firm—Allan M. Lowe; C. Henry Peterson

[57] ABSTRACT

A moisture and fiber content controller for the manufacture of paper responds to measurements of greatest maximum moisture and greatest minimum basis weight values derived by scanning gauges across a paper sheet during manufacture. The maximum and minimum moisture and basis weight signals are compared with limit values therefor to control fiber flow and dryers in paper manufacture.

17 Claims, 3 Drawing Figures

GEORGE I. DOERING
INVENTOR.

BY

Lowe & King
ATTORNEYS

Position of gauge 25 across width of sheet ⟶

GEORGE I. DOERING
INVENTOR.

BY

Lowe & King

ATTORNEYS

PEAK RESPONSIVE CONTROL SYSTEM AND METHOD

This is a continuation of Ser. No. 726,439, filed May 3, 1968, now abandoned.

The present invention relates generally to process controllers and, more particularly, to a process control system and method responsive to a peak value of a property of the processor output over a finite length sampling period.

Existing process control systems and methods generally strive to maintain a process output property at an average value considerably different from a tolerable limit value. It has been thought necessary to maintain the average process value at a point materially different from the tolerable limit value because of the statistical nature by which a processor functions. In particular, a processor can be adjusted to derive an output having a predetermined, finite average value, but some of the processor output will deviate, in some cases materially, from the average, desired value; the amount of deviation being dependent inter alia, upon tolerances of the input materials and the condition of the processor equipment.

In many instances, however, it is desirable to operate a processor to produce an output that is as close as possible to a limit value. For example, in the manufacture of paper, the paper manufacturer strives to provide a product, within limits, that is as moist as possible and has a minimum basis weight (weight per unit area). In paper manufacture, the upper and lower limits of moisture and basis weight are respectively established by the ultimate use to which the paper is put. If paper has excessive moisture, it is likely to turn black; if the paper has a basis weight less than a predetermined value, it is likely to tear more readily than desired. The paper maker, however, desires to minimize basis weight and maximize moisture so that a product having maximum weight can be derived with a minimum amount of fiber material. Hence, the paper maker desires to manufacture a product having target values of moisture and basis weight as close as possible to limit values that will enable the product to still be acceptable to the customer. It is his object to provide a product having a property as close as possible to a limit value and an average value sufficiently removed from the limit value to prevent the limit from being exceeded.

The paper sheet has a two-dimensional nature. Variations of basis weight or moisture occur in both the machine direction and across the machine. Total variation at any point in the sheet is the sum of both components. As background for the analysis of property variations in paper sheet, reference is made to the article entitled "Metrology-Impact of Sampling Theory," by John E. DeWitt, of Industrial Nucleonics Corporation, in "Pulp and Paper," Jan. 1, 1968.

The two-dimensional nature of the property variations in a paper sheet, for example, creates unique control considerations that are solved to a significant degree by the present invention.

Techniques have been developed for determining the extent of the expected deviations of a processor output from the average value, as a guide to the selection of a target value, or desired value, at which the average value is to be maintained. The target value selected is judged to be as close as possible to the limiting value, allowing a margin of safety, with due regard to the extent of the expected deviation, such that the limiting value is seldom or never exceeded. The prior art techniques, however, require a statistical analysis of the processor output, involving relatively complex computer apparatus to provide the required data in a timely manner. A preferred embodiment of an invention utilizing statistical analysis is described in application Ser. No. 680,695, filed Nov. 6, 1967, for "Process Controller . . .", now U.S. Pat. No. 3,515,860 and assigned to the same assignee as the present application.

In accordance with the present invention, a relatively inexpensive and uncomplex process control system and method are provided wherein a property limit value is compared with a greatest peak value of the property as derived from the processor over a finite length sampling period. For convenience, the term "peak valve" is used to refer to either a maximum or a minimum value of the property, as illustrated by the examples to be described. The process controller is activated in response to the deviation between the greatest peak and limit values. By controlling the process in response to the greatest peak, either maximum or minimum, value, the processor output is maintained at an average value in proximity to the limit value and a most economical process is attained.

According to a further feature of the invention, spikes that may occur in the peak value do not adversely affect the controller if they have a time interval less than a predetermined length. Spikes in the peak value can be ignored because a certain percentage of the process output can exceed the limit value under normal circumstances, without adversely affecting the process final product. One facile manner for eliminating the occurrence of spikes in the peak value is to provide a low pass filter between a gauge measuring a process parameter and a peak value detector.

It is, accordingly, an object of the present invention to provide a new and improved process control system and method.

Still another object of the present invention is to provide a new and improved process and control system and method wherein the requirement for relatively complex statistical computers is obviated and the processor is operated in an efficient manner whereby the processor output has an average value optimally proximate to a limit value.

Another object of the present invention is to provide a process control system and method wherein the peak value of the process output is compared with a limit value.

A further object of the present invention is to provide a new and improved process control system and method wherein the average value of the processor output is maintained at a value proximate a limit value, while the processor produces a controlled amount of a defective output.

The above and still further objects, features and advantages of the present invention will become apparent upon consideration of the following detailed description of one specific embodiment thereof, especially when taken in conjunction with the accompanying drawings, wherein.

The present invention is described specifically in conjunction with the manufacture of paper. It is to be understood, however, that the principles of the invention are equally applicable to controlling any other processor, such as a plastic extruder, steel rolling mill, etc., wherein the processor output is subject to deviations of a statistical nature about an average value.

Figure 1:
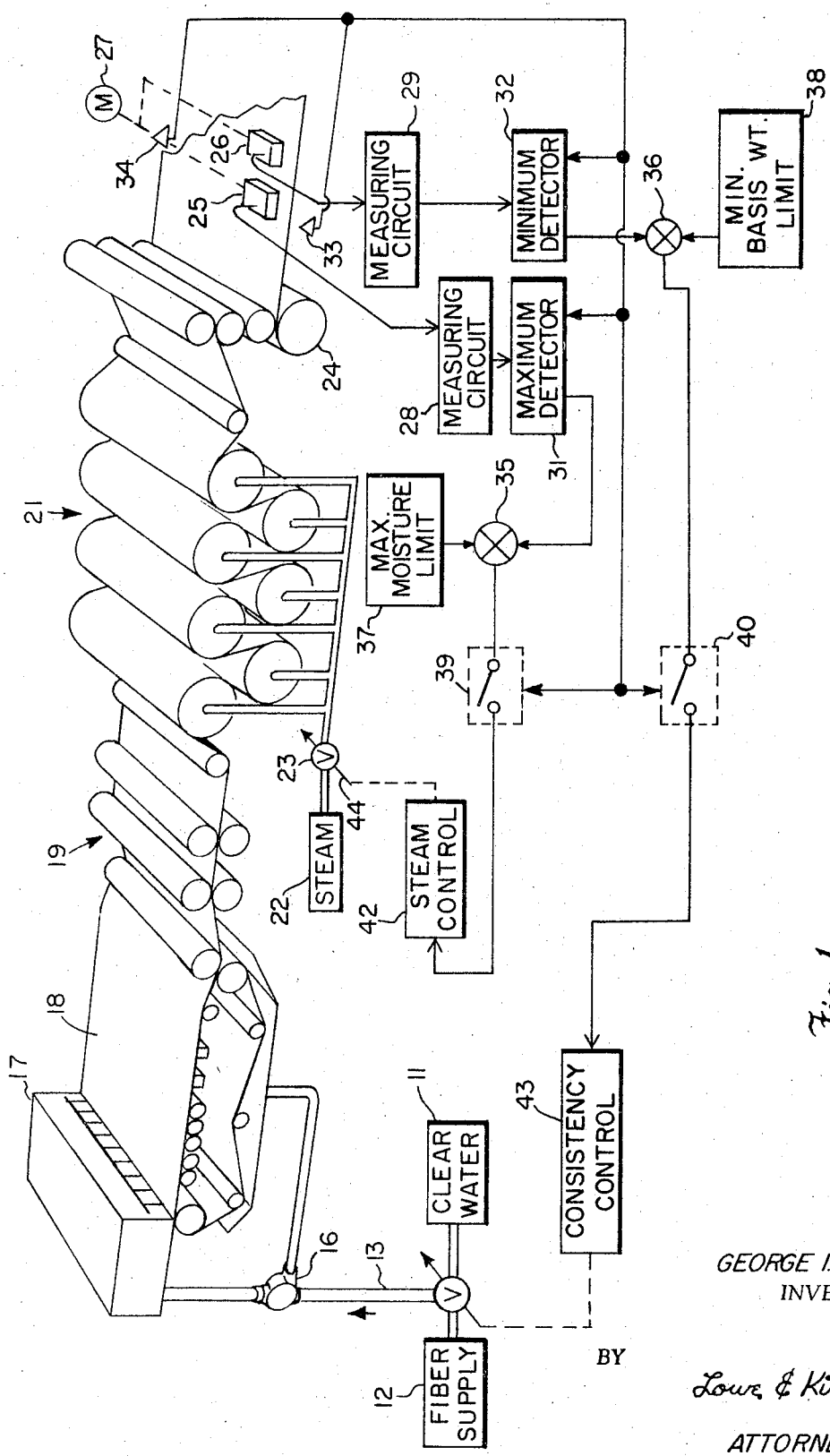
FIG. 1 is a block diagram indicating the manner by which the present invention may be applied to a paper mill.

Reference is now made to FIG. 1 of the drawings wherein there is illustrated a control system in accordance with the present invention, in combination with a paper making machine or facility. The paper making facility is of the conventional type, including a source 11 of clear water and a fiber supply source 12. Water from source 11 and fiber from supply 12 are mixed together in pipe 13, with the ratio of the fiber to water mass being varied in response to operation of valve 15 in the water supply line. The water-fiber mixture in pipe 13 is fed through pump 16 to headbox 17. Downstream of headbox 17 is Fourdrinier wire 18 which removes water emerging from the slice of headbox 17 and feeds the water back to an inlet of pump 16.

Downstream of Fourdrinier wire 18 are water removing press rollers 19, followed by dryer section 21. Dryer section 21 removes controlled amounts of water from the paper sheet in response to the application of steam from source 22 to the various dryer rollers. The amount of steam fed to drying section 21 from steam source 22 is varied and controlled by valve 23.

The relatively moisture-free paper emerging from dryer section 21 is polished and smoothed by calender rollers 24. The sheet emerging from rollers 24 is the finished product that is fed to a takeup roller, not shown.

To measure the moisture and basis weight properties of the finished product paper sheet emerging from rollers 24, traversing moisture and basis weight gauges 25 and 26 are provided. Motor 27 scans gauges 25 and 26 together across the width of the sheet emerging from rollers 24, whereby the gauges derive d.c. analog signals respectively indicative of the moisture and basis weight of different sheet sections which are sequentially sampled by the gauges.

To derive signals which are indicative of the moisture content and basis weight of each section of the sheet sampled by gauges 25 and 26, the gauge outputs are fed to moisture and basis weight circuits 28 and 29, respectively. Measuring circuits 28 and 29 are of the well known type, preferably of the type described in the U.S. Pat. to Baird No. 3,241,062, issued on Mar. 15, 1966, and the U.S. Pat. to Chope No. 2,790,945. Either of these instruments is adapted, by the use of a modified repeat slidewire bridge arrangement similar to that described in the Varner U.S. Pat. No. 2,895,888, to produce a d.c. output voltage which increases with either an increase or a decrease in the value of the measured quantity.

The peak values of the d.c. output signals of measuring circuits 28 and 29, representing maximum moisture content and minimum basis weight values respectively, are detected by feeding the signals to maximum and minimum detectors 31 and 32. Detectors 31 and 32 respectively derive responses indicative of the greatest peak value of the moisture and basis weight properties over a finite length sampling period, generally a period on the order of one scan time of gauges 25 and 26 across the width of the sheet. To provide signals that a sampling period has been completed and gauges 25 and 26 have scanned across the entire width of the sheet, normally open circuited microswitches 33 and 34 are provided on each side of the sheet. Microswitches 33 and 34 derive positive, binary one signals only in response to gauges 25 and 26 being scanned completely across the width of the sheet. The binary one signal is fed to maximum and minimum detectors 31 and 32 to enable the greatest maximum and greatest minimum values of moisture and basis weight detected during the previous scan to be sampled and read out.

The greatest maximum and greatest minimum values derived by detectors 31 and 32 upon the completion of each scan of gauges 25 and 26 are compared with preset values indicative of the maximum moisture and minimum basis weight limits. To these ends, the output signals of detectors 31 and 32 are respectively applied as the minuend inputs of analog subtraction circuits 35 and 36. The subtrahend inputs of subtracters 35 and 36 are respectively derived from variable voltage d.c. sources 37 and 38, adjusted to have values commensurate with the maximum moisture limit and minimum basis weight limit of the sheet emerging from rollers 24. The maximum moisture limit value of source 37 is determined from a priori knowledge regarding the maximum amount of moisture which can be stored in paper without discoloration to the paper. In contrast, the minimum basis weight limit voltage derived from source 38 is determined by desired strength properties of the sheet. The paper maker desires to produce a paper sheet having a maximum moisture content and minimum basis weight so that the most economical product, which is sold on the basis of area, can be sold.

To maintain the moisture and fiber content of the finished sheet as close as possible to the maximum and minimum values, valves 23 and 15 are activated in response to the deviation signals derived from subtracters 35 and 36 at the end of each scanning period of gauges 25 and 26. To this end, the output signals of subtracters 35 and 36 are respectively fed through normally open switches 39 and 40 to steam and consistency controllers 42 and 43. Switches 39 and 40 are closed after each scan of gauges 25 and 26 across the width of the sheet in response to activation of microswitches 33 and 34. Each of controllers 42 and 43 derives an output signal in response to the deviation signal fed thereto to actuate valve controllers 44 and 45 for time periods directly proportional to the deviation voltages periodically fed to the controllers through switches 39 and 40. Each of controllers 42 and 43 includes a conventional dead band provision whereby no signal is fed to valve controllers 44 and 45 if the deviation signal fed to the controllers is less than a predetermined value.

Figure 2:
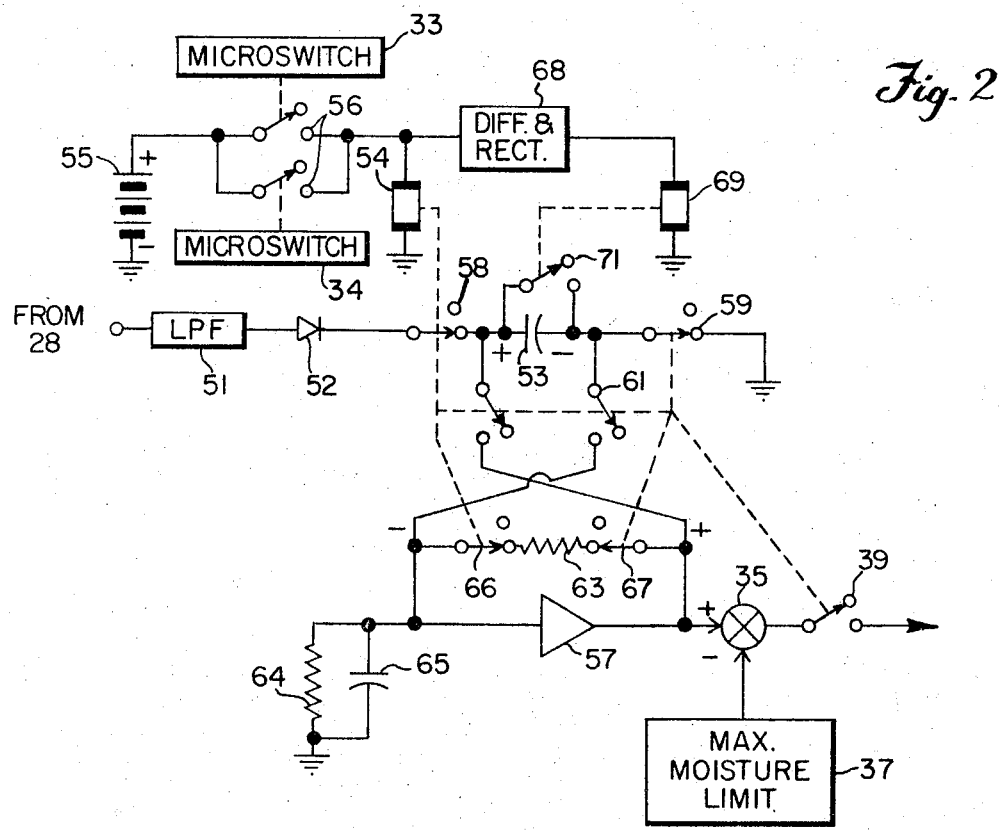
FIG. 2 is a circuit diagram of a preferred embodiment of a maximum value detector employed in the system of FIG. 1.

Consideration is now given to FIG. 2 of the drawings wherein for purposes of example there is illustrated a circuit diagram of one suitable type of maximum value detector 31. Maximum value detector 31 includes low pass filter 51 for smoothing the output signal of measuring circuit 28. Low pass filter 51 has a time constant selected to substantially attenuate any spikes having a period commensurate with less than about a three inch traverse of gauge 25 across the width of the sheet. Filter 51 thereby prevents any sudden, short duration maximum value signals from being coupled to the remainder of the maximum value detector. The function of low pass filter 51 can be performed by other apparatus such as pulse amplitude and duration detecting apparatus that decouples the remainder of detector 31 from short duration maximum peaks in the signal derived by measuring circuit 28.

The smoothed output signal of low pass filter 51 is coupled to a maximum value detector comprising the series combination of diode 52 and capacitor 53. Diode 52 is poled so that it is forward biased only in response to the output of filter 51 exceeding the voltage stored by capacitor 53. Thereby, the voltage across the electrodes of capacitor 53 is indicative at any time of the maximum voltage derived by moisture measuring circuit 28 during a scan of gauge 25 between microswitches 33 and 34.

Upon the completion of a scan of gauges 25 and 26 across the sheet, one of microswitches 33 or 34 is activated, enabling relay winding 54 to be connected with d.c. source 55 through one of microswitch armatures 56. In response to winding 54 being activated, the greatest or largest maximum voltage stored across the electrodes of capacitor 53 is delivered as a constant, low impedance signal at the output terminal of d.c. operational amplifier 57. To this end, energization of relay 54 open circuits contacts 58 and 59, which normally connect capacitor 53 to ground through diode 52 in series with the output of low pass filter 51, and closes normally open contacts 61 and 62. Closure of relay contacts 61 and 62 enables the electrodes of capacitor 53 to be connected in a negative feedback circuit with the input and output terminals of d.c. operational amplifier 56. The output voltage of amplifier 57 is maintained at the value of the stored maximum voltage across the plates of capacitor 53 while relay 54 is energized because if there is any difference between the amplifier output voltage and the voltage across the capacitor, the difference will appear as an input voltage to the amplifier, and the amplifier will automatically adjust its output voltage to bring the difference to zero. Feedback resistor 63, which stabilizes the gain and maintains the condition of zero output for zero input of amplifier 57 while gauges 25 and 26 are being scanned across the sheet, is open circuited while relay winding 54 is energized. Resistor 63 is disconnected from the amplifier feedback circuit in response to energization of winding 54 which open circuits normally closed relay contacts 66 and 67.

During the interval while relay 54 is energized at the end of each scan of guage 25 across the width of the finished product sheet and the output voltage of amplifier 57 is maintained constant at a value commensurate with the greatest maximum moisture output of circuit 28 detected during the scan, the deviation output voltage of subtracter 35 is coupled to steam controller 42 through contacts 39, which are closed in response to energization of relay 54. Steam controller 42 is thereby responsive to the deviation output voltage of subtracter 35 only upon completion of a scan of moisture gauge 25 across the width of the finished sheet and the steam controller is activated on a discontinuous basis. Because the transport time of the sheet between dryer section 21 and moisture gauge 25 is less than the period between successive closures of switch 39, the steam controller need not include relatively complex timing means for discontinuous application of signals to valve controller 44.

As each scan of gauge 25 across the width of the sheet commences, it is necessary to remove the charge stored on capacitor 53 during the previous scan; otherwise, the greatest maximum voltage of a previous scan could be continuously fed to operational amplifier 57 and inaccurate results produced. To remove the charge stored on capacitor 53 as each new scan of gauge 25 commences, differentiating and rectifying network 68 is connected in parallel with relay coil 54. Differentiating and rectifying network 68 blocks the positive going pulses derived in response to contacts 56 being initially closed but passes the negative going pulses which occur in response to switches 56 being switched from a closed to an open circuit condition. The negative going pulses pass through differentiating and rectifying network 68 to activate the winding of relay 69 for a relatively short time interval. The interval is sufficient, however, to enable contacts 71 to be closed to discharge the charge stored on capacitor 53. By the time gauge 25 has traversed from the microswitch position to the edge of the paper proximate the microswitch, contact 71 has open circuited and the short circuit across the electrodes of capacitor 53 has been removed, enabling the detector circuit to function properly.

Minimum detector 32 is preferably constructed and functions in the same manner as maximum detector 31. The difference between the two circuits is that whereas the moisture measuring circuit 28 produces an increasing output voltage with increasing moisture, the basis weight measuring circuit produces an increasing output voltage with decreasing basis weight. Thereby, the charge stored on the detector capacitor at any instant indicates the greatest minimum basis weight output signal of measuring circuit 29 during a scan of basis weight gauge 26 across the width of the sheet.

To provide a better and more complete understanding of the functioning of the present invention, consideration is now given to the operation thereof. The system operation will be described in conjunction with controlling moisture content of the sheet being processed in response to a measurement made by gauge 25 and the application of a control signal to valve controller 44 for valve 23.

Figure 3:
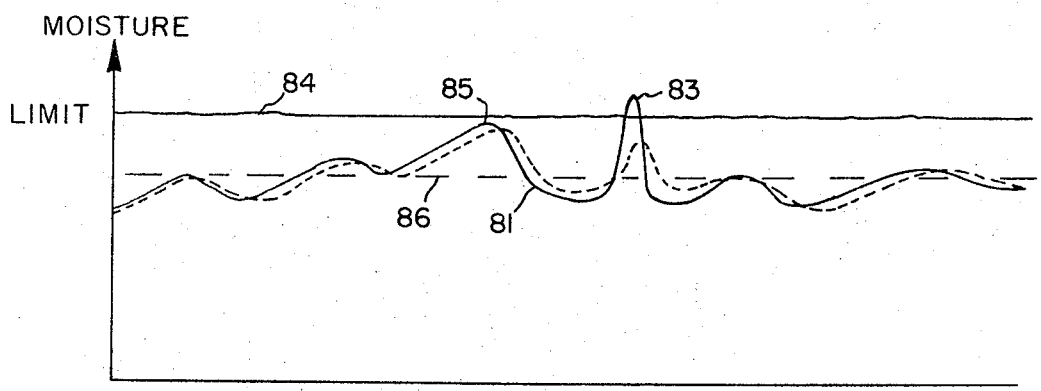
FIG. 3 illustrates a plot helpful in describing the manner by which the present invention functions.

A typical response of moisture measuring circuit 28 for a scan of gauge 25 across the width of the sheet emerging from rollers 24 is indicated by waveform 81 of FIG. 3, wherein moisture content is plotted against the position of gauge 25 across the sheet width. The moisture indicating output signal of measuring circuit 28 is fed through low pass filter 51, having an output indicated by dashed line curve 82. It is noted that the output of low pass filter 51 does not include the relatively sharp peak 83 in waveform 81, which peak exceeds the limit value set by horizontal line 84. It is desirable to exclude peak 83 because of the short duration thereof. Short duration peak 83, in all likelihood, was derived because of a nonrecurring, noise-like process regarding the formation of the paper sheet and, hence, should not influence to any great extent the amount of paper moisture to be removed by dryer section 21. It is noted from waveform 81, however, that relatively stable peak 85 is accurately reflected in the output 82 of low pass filter 51.

Maximum amplitude detector 31 responds to peak 85 and a voltage commensurate with the greatest maximum peak is stored by capacitor 53 until completion of a traverse of gauge 25 across the width of the sheet. Upon completion of gauge 25 being scanned across the sheet width, microswitch 34 is activated and a voltage commensurate with greatest maximum peak amplitude 85 is fed to the minuend input of subtracter 35, the subtrahend input of which is set to a voltage proportional to limit 84. Subtracter 35 derives a signal indicative of the deviation of greatest maximum peak value 85 and limit value 84.

The deviation signal is fed through switch 39 to activate steam controller 42. The deviation signal polarity indicates that dryer section 21 is removing excessive water from the paper because peak value 85 is below limit value 84. In response to the deviation signal polarity, steam controller 42 drives valve controller 44 by an amount tending to close valve 23 and reduce the amount of steam fed from source 22 into dryer section 21. The amount by which valve 23 is closed is directly proportional to the deviation between peak and limit values 85 and 84, whereby the reduction in the moisture removal dryer section 21 is directly proportional to the deviation.

By increasing the moisture of the sheet emerging from rollers 24, the average moisture value of the paper is driven closer to the limit value established by line 84, whereby a more economical paper product is manufactured.

In the opposite situation, where the paper is generally too moist so that stable moisture peak such as peak 85 exceeds the limit 84, the deviation signal fed through switch 39 to controller 42 will have the opposite polarity, causing the controller to act in the opposite direction, thus reducing the moisture in the sheet.

Hence, in accordance with the present invention the average value of moisture in the paper sheet can be maximized relative to a limit value if there is a relatively narrow distribution of paper moisture about the average value. Control is effected in response to a limit value, rather than a preset average value set point selected with or without regard to the statistical distribution of the moisture property.

Valve 15 is controlled in response to the greatest minimum basis weight signal (greatest maximum voltage signal) derived by measuring circuit 29 for a scan of gauge 26 across the width of the sheet in substantially the same manner indicated with regard to control of valve 23. In this case when the greatest peak voltage signal is below the limit voltage value, indicating that the basis weight of the sheet is greater than necessary, valve 15 is adjusted to decrease the rate of fiber flow to headbox 17. The opposite action takes place when the greatest peak voltage signal is greater than the limit value. The illustrated embodiment of the present invention, when utilized for varying the fiber-water consistency, enables consistency controller 43 to be simplified because the controller is activated only once each time switch 40 is closed at the end of each scan of gauge 26 across the sheet. Controller 43 is activated only once for each scan of gauge 26 across the sheet because the transport time of the product from inlet pipe 13 to gauge 26 is slightly less than the time required for a scan of the gauge across the sheet. Hence, complex timing and sheet velocity monitoring apparatus required of many prior art systems for intermittent operation of the consistency controller is obviated.

Where appropriate however, the gauge or gauges may be arranged to scan more rapidly relative to the transport time, and instead of activating the control once per scan, it may be activated only on every other scan, or once every N scans where N represents any number of scans. While the embodiment illustrated utilizes the greatest peak value of data representing the measurements obtained during only one scan, it may be desirable to accumulate the data from a plurality of scans to obtain a composite average profile, for example, in the manner described in the copending application of Edward J. Freeh, Ser. No. 682,336, filed Nov. 13, 1967, now U.S. Pat. No. 3,552,203 and control from the greatest peak of the average profile, or the control can be from the largest peak obtained from several scans. Alternatively, the control can be in relation to the machine direction signal at a representative location, derived from successive scans, as taught in the above mentioned Freeh application. While a scanning gauge arrangement has been shown and is preferred for most installations, it must be recognized that under certain circumstances a single-point gauge, measuring at one location across the sheet can be used to obtain a representative signal from which control in relation to the greatest peak can occur, as described hereinbefore. In addition, or alternately, other elements of a paper machine, for example, can be controlled to obtain the desired basis weight or moisture specification.

In the preferred embodiment, the measuring circuits 28 and 32 are adapted to provide d.c. output voltages which do not change polarity but always simply increase or decrease as required with increasing or decreasing values of the measured property, and the maximum and minimum detectors are constructed in an identical manner. However, if desired, the measuring circuits may be adapted, as specifically shown in the Varner patent supra, to produce output voltages in the form of deviation voltages indicative of property deviations from some nominal reference value such as that indicated in FIG. 3 by the dashed line 86. In this case, maximum peaks may be manifested, say, as positive voltage values and detected by the circuit specifically shown in FIG. 2. Minimum peaks, on the other hand, are manifested as negative voltage values and may be detected by reversing the connections to the diode 52.

Thus, while there has been described and illustrated one specific embodiment of the invention, it will be clear that variations in the details of the embodiment specifically illustrated and described may be made without departing from the true spirit and scope of the invention as defined in the appended claims. For example, the automatic controller can be replaced with a manual operation performed by an operator monitoring meter 91 in the output circuit of subtracter 36.

I claim:

1. A system for controlling a property of an output of a sheet processor comprising gauge means monitoring the property for deriving a signal that is a replica of property variations of the output, means for scanning the gauge in a direction between edges of the sheet, means responsive to the signal replica for selecting the peak value of the property derived from at least one scan of the gauge means in a direction between the edges, said selected peak value being the peak value which is displaced by the greatest extent from a nominal value for the property over the scan, means responsive to said selecting means for controlling the processor in response to a comparison of the selected peak value with a predetermined limit value for the property so that the selected peak value is controlled to approach said limit value, said control means including means for controlling the processor by an amount indicative of the deviation of the selected peak value from the predetermined limit value.

2. A system for controlling a sheet processor comprising gauge means for detecting and measuring a set of values indicative of a property of the sheet at a plurality of points across the width thereof, means for scanning the gauge means in a direction between the sheet edges, processing means for detecting a peak value of the property from the set as derived from at least one scan of the gauge means, the detected peak value being a peak value displaced by the greatest extent from a nominal value for the set of values, means responsive to said processing means for controlling a parameter of the sheet affecting the property in response to a comparison of the detected peak value with a predetermined limit value for the property so that the detected peak value is controlled to approach said limit value.

3. The system of claim 2 wherein said processing means includes means for excluding peak values having durations less than a predetermined interval.

4. A system for controlling basis weight of a fibrous sheet being made by a fibrous sheet making machine comprising gauge means scanning between the sheet edges for detecting a minimum basis weight value of the sheet from at least one scan, the detected minimum value being the basis weight value displaced by the greatest extent from a nominal value for the sheet basis weight, and means responsive to said gauge means for controlling the sheet fiber-water ratio in response to a comparison of the detected minimum value with a predetermined limit minimum value for the property so that the detected minimum value is controlled to approach said limit minimum value.

5. A system for controlling moisture and basis weight of a fibrous sheet being made by a fibrous sheet making machine, comprising gauge means scanning between the sheet edges for detecting a maximum moisture value and minimum basis weight value of the sheet from at least one scan, the detected maximum value being the moisture value displaced by the greatest extent from a nominal value for the sheet moisture, the detected minimum value being the basis weight value displaced by the greatest extent from a nominal value for the sheet basis weight, and means responsive to said gauge means for controlling the sheet moisture in response to a comparison of the detected maximum value with a predetermined limit value for moisture so that the detected maximum value is controlled to approach said moisture limit value and for controlling the sheet basis weight in response to a comparison of the detected minimum value with a predetermined limit value for basis weight so that the detected minimum value is controlled to approach said basis weight limit value.

6. The system of claim 5 wherein said controlling means includes: means for deriving a first indication of the deviation between a predetermined maximum limit value of moisture and the detected maximum moisture value, means for deriving a second indication of the deviation between a predetermined minimum limit value for basis weight and the detected minimum basis weight, means for controlling a dryer section of the paper making facility in response to the first indication, and means for controlling the sheet fiber-water ratio in response to the second indication.

7. A method of controlling the basis weight of a sheet being made by a fibrous sheet producing facility comprising the steps of scanning a gauge means for detecting basis weight in a direction between the sheet edges, detecting a minimum basis weight value derived by the gauge means during the time it is scanned at least once between the sheet edges, the detected minimum value being the basis weight value displaced by the greatest extent from a nominal value for the sheet basis weight, and controlling the sheet fiber-water ratio in response to deviation of the detected minimum value relative to a predetermined minimum limit value for the basis weight so that the detected peak value is controlled to approach said limit value.

8. A method of controlling the basis weight and moisture of a sheet being made by a fibrous sheet producing facility comprising the steps of scanning a gauge means between edges of the sheet, detecting a maximum value of sheet moisture and minimum value of sheet basis weight derived by the gauge means during the time it is scanned at least once between the sheet edges, the detected maximum value being the sheet moisture value displaced by the greatest extent from a nominal value for the sheet moisture value and the detected minimum value being the sheet basis weight displaced by the greatest extent from a nominal value for the sheet basis weight, and controlling dryer sections of the facility and the water-fiber consistency flowing into the facility respectively in response to deviations between predetermined maximum and minimum limit values of moisture and basis weight relative to the detected maximum moisture value and minimum basis weight so that the sheet detected maximum moisture value is controlled to approach the moisture limit value and the sheet detected minimum basis weight value is controlled to approach the basis weight limit value.

9. A system for deriving a signal indicative of a property of a longitudinally moving sheet comprising means for measuring a parameter related to the property, means for scanning said measuring means in a direction between edges of the moving sheet, means responsive to the scanning measuring means for decoupling peak values of the parameter having durations less than a predetermined time interval from the peak value detecting means, means responsive to the measuring means for detecting the peak value of the parameter for each scan of the measuring means, the peak value detected being the peak value displaced by the greatest extent from a nominal value for the parameter, and output means responsive only to the detected peak value for each scan for deriving a signal indicative of the detected peak value.

10. The system of claim 9 wherein the peak value detecting means includes storage means responsive to the scanning measuring means for storing a peak parameter value, means for changing the parameter value stored in the storage means in response to the measuring means deriving a parameter value beyond the stored parameter value during each scan of the measuring means, and means for activating the storage means to store a new peak parameter value when each new scan of the measuring means commences.

11. The system of claim 9 wherein the peak value detecting means includes storage means responsive to the scanning measuring means for storing a peak parameter value over a scan of the measuring means, and means for activating the storage means to store a new peak parameter value when each new scan of the measuring means commences.

12. A system for controlling a property of an output of a sheet processor comprising gauge means monitoring the property for deriving a signal that is a replica of property variations of the output, means for scanning the gauge in a direction between edges of the sheet, means responsive to the signal replica for selecting the greatest maximum peak value of the property derived from at least one scan of the gauge means in a direction between the edges, means responsive to said selecting means for controlling the processor in response to a comparison of the selected peak value with a predetermined limit value for the property so that the selected peak value is controlled to approach said limit value, said control means including means for controlling the processor by an amount indicative of the deviation of the selected peak value from the predetermined limit value.

13. A system for controlling a sheet processor comprising gauge means for detecting and measuring a set of values indicative of a property of the sheet at a plurality of points across the width thereof, means for scanning the gauge means in a direction between the sheet edges, processing means for detecting the greatest maximum peak value of the property from the set as derived from at least one scan of the gauge means, means responsive to said processing means for controlling a parameter of the sheet affecting the property in response to a comparison of the detected peak value with a predetermined limit value for the property so that the detected peak value is controlled to approach said limit value.

14. A system for controlling moisture of a fibrous sheet being made by a fibrous sheet making machine comprising gauge means scanning between the sheet edges for detecting a maximum moisture value of the sheet from at least one scan, the detected maximum value being the moisture value displaced by the greatest extent from a nominal value for the sheet moisture, and means responsive to said gauge means for controlling the sheet fiber-water ratio in response to a comparison of the detected maximum value with a predetermined limit maximum value for the property so that the detected maximum value is controlled to approach said limit maximum value.

15. A system for controlling a sheet processor comprising gauge means for detecting and measuring a set of values indicative of a property of the sheet at a plurality of points across the width thereof, means for scanning the gauge means in a direction between the sheet edges, processing means for detecting the greatest minimum peak value of the property from the set as derived from at least one scan of the gauge means, means responsive to said processing means for controlling a parameter of the sheet affecting the property in response to a comparison of the detected peak value with a predetermined limit value for the property so that the detected peak value is controlled to approach said limit value.

16. A system for controlling a sheet processor comprising gauge means for detecting and measuring a set of values indicative of a property of the sheet at a plurality of points across the width thereof, means for scanning the gauge means in a direction between the sheet edges, processing means for detecting the greatest maximum peak value of the property from the set as derived from at least one scan of the gauge means, means responsive to said processing means for controlling an actuator for the average value of a parameter of the sheet affecting the property in response to a comparison of the detected peak value with a predetermined limit value for the property so that the detected peak value is controlled to approach said limit value.

17. A system for controlling a sheet processor comprising gauge means for detecting and measuring a set of values indicative of a property of the sheet at a plurality of points across the width thereof, means for scanning the gauge means in a direction between the sheet edges, processing means for detecting the greatest minimum peak value of the property from the set as derived from at least one scan of the gauge means, means responsive to said processing means for controlling an actuator for the average value of a parameter of the sheet affecting the property in response to a comparison of the detected peak value with a predetermined limit value for the property so that the detected peak value is controlled to approach said limit value.

* * * * *